(12) United States Patent
Mangal et al.

(10) Patent No.: US 6,865,398 B2
(45) Date of Patent: Mar. 8, 2005

(54) METHOD AND SYSTEM FOR SELECTIVELY REDUCING CALL-SETUP LATENCY THROUGH MANAGEMENT OF PAGING FREQUENCY AND BUFFERING OF USER SPEECH IN A WIRELESS MOBILE STATION

(75) Inventors: Manish Mangal, Overland Park, KS (US); Pawan Chaturvedi, Overland Park, KS (US); Mark L. Yarkosky, Overland Park, KS (US); Tong Zhou, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 6 days.

(21) Appl. No.: 10/067,080

(22) Filed: Feb. 4, 2002

(65) Prior Publication Data

US 2003/0148785 A1 Aug. 7, 2003

(51) Int. Cl.$^7$ ................................................ H04M 1/00
(52) U.S. Cl. .................... 455/552.1; 455/458; 455/518; 455/557; 455/456.5; 455/519; 455/428; 455/560; 370/375; 370/376; 370/280; 370/337; 370/347
(58) Field of Search .............................. 455/552.1, 458, 455/518, 519, 428, 456.5, 557, 552

(56) References Cited

U.S. PATENT DOCUMENTS

| | | | |
|---|---|---|---|
| 4,870,408 A | 9/1989 | Zdunek et al. | |
| 5,442,809 A | 8/1995 | Diaz et al. | |
| 5,568,511 A | 10/1996 | Lampe | |
| 5,710,591 A | 1/1998 | Bruno et al. | |
| 5,818,836 A | 10/1998 | DuVal | |
| 5,850,611 A | 12/1998 | Krebs | |
| 5,884,196 A | 3/1999 | Lekven et al. | |
| 5,936,964 A | 8/1999 | Valko et al. | |
| 5,983,099 A | 11/1999 | Yao et al. | |
| 6,014,556 A | 1/2000 | Bhatia et al. | |
| 6,032,051 A | 2/2000 | Hall et al. | |
| 6,041,241 A | * 3/2000 | Willey | ........................ 455/574 |
| 6,119,017 A | 9/2000 | Cassidy et al. | |
| 6,178,323 B1 | 1/2001 | Nagata | |
| 6,381,467 B1 | 4/2002 | Hill et al. | |
| 6,490,452 B1 | 12/2002 | Boscovic et al. | |
| 6,526,377 B1 | 2/2003 | Bubb | |
| 2002/0055364 A1 | 5/2002 | Wang et al. | |
| 2002/0071445 A1 | 6/2002 | Wu et al. | |
| 2002/0145990 A1 | 10/2002 | Sayeedi | |
| 2002/0147818 A1 | 10/2002 | Wengrovitz | |
| 2002/0172165 A1 | 11/2002 | Rosen et al. | |
| 2002/0172169 A1 | 11/2002 | Rosen et al. | |
| 2002/0173325 A1 | 11/2002 | Rosen et al. | |
| 2002/0173326 A1 | 11/2002 | Rosen et al. | |

(List continued on next page.)

FOREIGN PATENT DOCUMENTS

| | | |
|---|---|---|
| EP | 0 817 457 | 1/1998 |
| EP | 0 984 608 | 3/2000 |

OTHER PUBLICATIONS

3$^{rd}$ Generation Partnership Project 2 (2002), *Fast Call Set–Up*, 1–6.

(List continued on next page.)

*Primary Examiner*—Marceau Milord (57) ABSTRACT

A method and system for selectively reducing call-setup latency. The method and system provides for selectively increasing the paging frequency used for paging certain mobile stations, so as to decrease the time that it takes to establish radio-link connectivity with those mobile stations. The method and system is particularly useful when establishing real-time communication sessions, such as instant chat sessions, but may be useful in other scenarios as well.

4 Claims, 7 Drawing Sheets

U.S. PATENT DOCUMENTS

| | | | |
|---|---|---|---|
| 2002/0173327 A1 | | 11/2002 | Rosen et al. |
| 2002/0177461 A1 | | 11/2002 | Rosen et al. |
| 2002/0191583 A1 | * | 12/2002 | Harris et al. ............... 370/345 |
| 2003/0008657 A1 | | 1/2003 | Rosen et al. |
| 2003/0021264 A1 | | 1/2003 | Zhakov et al. |
| 2003/0114156 A1 | * | 6/2003 | Kinnavy .................... 455/434 |

OTHER PUBLICATIONS

Douskalis, (2002) *IP Telephony: The Integration of Robust VoIP Services*, 36–69.

Mobile Tornado, http://www.mobiletornado.com/products_iprsptt.html, printed from the World Wide Web on Jan. 27, 2003.

Qualcomm Chats Up "Push–to–Talk," http://siliconvalley.internet.com/news/print.php/953261, printed from the World Wide Web on Jan. 27, 2003.

U.S. Appl. No. 10/277,465, filed Oct. 22, 2002 entitled "Method for Call Setup Using Short Data Bursts".

International Search Report from International Application No. PCT/US03/02950, dated Nov. 06, 2003.

International Search Report from International Application No. PCT/US02/31411, dated Mar. 4, 2003.

International Search Report from International Application No. PCT/US02/29575, dated Dec. 10, 2002.

International Search Report from International Application No. PCT/US02/36055, dated Apr. 10, 2003.

International Search Report from International Application No. PCT/US03/03021, dated Jun. 18, 2003.

Schulzrinne and Rosenberg, "SIP Caller Preferences and Callee Capabilities," Internet Engineering Task Force, Internet Draft, Oct. 22, 1999.

Vakil et al., "Host Mobility Management Protocol Extending SIP to 3G–IP Networks," Internet Engineering Task Force, Internet Draft, Oct. 1999.

Campbell and Sparks, "Control of Service Context Using SIP Request—URI," Network Working Group, Apr. 2001.

Ericsson, www.telecomcorridor.com/wireless%20horizons/1Coyne.pdf, printed from the World Wide Web on Jun. 27, 2001.

Dirk Kutscher/Jorg Ott, "The Message Bus—A Communication & Integration Infrastructure for Component–Based Systems," White Paper, Jan. 2000.

Ott et al., "A Message Bus for Local Coordination," Network Working Group, Internet–Draft, May 30, 2001.

TR45, Medium Access Control (MAC) Standard for cdma2000 Spread Spectrum Systesm, IS–2000–3, Jul. 12, 1999.

$3^{rd}$ Generation Partnership Project 2 '3GPP2', "Interoperability Specification (IOS) for CDMA 2000 Access Network Interfaces—Part 3 Features," Nov. 2001.

Perkins, "IP Mobility Support," Internet Engineering Task Force Request for Comment 2002, Oct. 1996.

Perkins, "IP Encapsulation within IP," Internet Engineering Task force Request for Comments 2003, Oct. 1996.

Perkins, "Minimal Encapsulation with in IP," Internet Engineering Task Force Request for Comments 2004, Oct. 1996.

Solomon, "Applicability Statement for IP Mobility Support," Internet Engineering Task Force Request for Comments 2005, Oct. 1996.

Handley et al., "SDP: Session Description Protocol," Internet Engineering Task Force Request for Comment 2327, Apr. 1998.

Handley et al., "SIP: Session Initiation Protocol," Internet Engineering Task Force Request for Comment 2543, Mar. 1999.

Fielding et al., "Hypertext Transfer Protocol—HTTP/1.1," Internet Engineering Task force Request for Comment 2616, Jun. 1999.

Rigney et al., "Remote Authentication Dial in User Service (RADIUS)," Internet Engineering Task Force Request for Comment 2865, Jun. 2000.

Rigney, "RADIUS Accounting," Internet Engineering Task Force Request for Comment 2866, Jun. 2000.

OMA, Discussion and definitions on PoC Floor Control, Input Contribution, Doc #OMA–REQ–2003–0375–PoC_Floor_Control, Jun. 2, 2003.

OMA, "PoC Use case: Mobile—PC Example," Input Contribution, Doc #OMA–REQ–2003–0323 PoC Mobile–PC use case, May 5, 2003.

OMA, "PoC Use case: Multimedia Group Call Example," Input Contribution, Doc #OMA–REQ–2003–0306–PoC UseCase–group–multimedia–scenario, May 6, 2003.

OMA, "PoC Use case: Examples of User Requirements," Input Contribution, Doc #OMA–REQ–2003–0305–PoC Use Case, May, 6, 2003.

OMA, "Inputs for PoC Requirements Document," Input Contribution, Doc #OMA–REQ–2003–0367–PoC_Input_Motorola, May 29, 2003.

OMA, "Push to Talk over Cellular (PoC)," Version: 0.1.6, May 12, 2003.

* cited by examiner

METHOD AND SYSTEM FOR SELECTIVELY REDUCING CALL-SETUP LATENCY THROUGH MANAGEMENT OF PAGING FREQUENCY AND BUFFERING OF USER SPEECH IN A WIRELESS MOBILE STATION

BACKGROUND

1. Field of the Invention

The present invention relates to communications and, more particularly, to methods and systems for initiating real-time media sessions. The invention is particularly useful to reduce latency in the initiation of "instant connect" or "push to talk" (PTT) sessions between data-capable mobile stations, such as 3G mobile stations for instance. However, aspects of the invention can be advantageously applied in other scenarios as well.

2. Description of Related Art

In an exemplary wireless communication system, each mobile station may communicate via an air interface with a base transceiver station (BTS) and in turn with a base station controller (BSC). The BSC may then be coupled with a mobile switching center (MSC). Further, the BSC may be coupled with packet data serving node (PDSN) or other gateway, which may provide connectivity with an IP network, such as the public Internet or a private intranet (e.g., a wireless carrier's core IP network). The mobile station may thus communicate with entities on the IP network via a communication path comprising the air interface, the BTS, the BSC and the PDSN.

A properly equipped mobile station can initiate packet-data communication by sending an initiation request message over an air interface access channel, and via the BSC, to the MSC. Applying industry standards, the initiation request message may include a "packet data" service option code that characterizes the requested communication as packet-data communication, as compared with traditional voice communication. When the MSC receives the initiation request, it may then detect the "data" service option code and responsively send the message back to the BSC for handling.

In turn, when the BSC receives the initiation request from the MSC, the BSC may establish a radio link layer connection with the mobile station, by assigning the mobile station to operate on a particular traffic channel over the air interface (e.g., a fundamental traffic channel, and perhaps one or more supplemental channels). In addition, the BSC may pass the initiation request to the PDSN. And the PDSN and mobile station may then negotiate with each other to establish a data-link layer connection, typically a point-to-point protocol (PPP) session over which packet data can be communicated between the mobile station and the PDSN.

As part of this process, the mobile station may obtain an IP address, to facilitate packet communications. For instance, the PDSN may assign an IP address to the mobile station, or the PDSN may communicate with a mobile-IP "home agent" to obtain an IP address for mobile station.

(Note that it may also be possible for a mobile station to engage more directly in packet-switched communications, rather than communicating packet data through a channelized PPP connection. For instance, the BTS itself might sit as a node on an IP network, and the mobile station might send and receive individual packets via the BTS.)

In most wireless communication systems like this, the radio-link layer connection with a mobile station may time-out after a predefined period of inactivity. For instance, after 10 seconds in which no data is communicated to or from the mobile station over the air interface, the BSC may release the traffic channel that had been assigned to the mobile station. At the same time, however, the data-link layer (e.g., PPP) connection with the mobile station might remain.

Once the radio-link layer connection with a mobile station has timed out, the mobile station will be considered "dormant." However, if its data-link layer connection still exists, the mobile station may still seek to send packet data to other entities, and other entities may seek to send packet data to the mobile station. When another entity seeks to send packet data to the mobile station, the BSC will page the mobile station over an air interface paging channel.

When a dormant mobile station receives a page indicative of an incoming data communication, or if the dormant mobile station seeks to send data, the radio link layer connection with the mobile station will need to be reestablished. To do so, the mobile station may send a message to the BSC over the access channel, requesting radio-link resources, and the BSC may then assign a traffic channel. The mobile station may then send or receive packet data over that traffic channel.

Some mobile stations may be equipped to automatically enter into an "always-on" data session upon power up, so as to provide IP network connectivity similar to that available through today's broadband landline modems. In particular, such a mobile station may be programmed to automatically send a "packet data" initiation request upon power up and to then negotiate with the PDSN to establish a PPP session. After an initial period of inactivity, the radio-link layer connection with the mobile station may time-out. But, as indicated above, the mobile station may then acquire a radio-link connection when desired.

A mobile station, like other packet-data terminals, can be further equipped to communicate real-time media, such as voice and/or video. For instance, the mobile station may include one or more media input mechanisms, such as a microphone or video camera, and may further include logic to digitize, encode and packetize media received through those mechanisms. Additionally, the mobile station may include logic to encapsulate the resulting packets with industry standard Real Time Protocol (RTP) headers and to transmit the resulting RTP packets to one or more designated addresses on the IP network.

Similarly, the mobile station may include logic to receive incoming RTP packets from the IP network, to assemble the packets in sequence, and to depacketize and decode the data carried by the packets so as to retrieve an underlying media signal. Further, the mobile station may include one or more media output mechanisms, such as a speaker or video display, through which to play out the incoming media signal to a user.

In order for a mobile station to establish RTP communication with another endpoint, the two endpoints will usually engage in setup signaling, which may take a variety of forms. For instance, according to the industry standard Session Initiation Protocol (SIP), an initiating endpoint may send to a SIP proxy server a SIP "INVITE" request message that designates a terminating SIP address. The INVITE may include a Session Description Protocol (SDP) block that characterizes the proposed session as an RTP session.

The proxy server may then query a SIP registry to determine an IP address of the terminating endpoint. And the proxy server may then forward the INVITE to that address. If the terminating endpoint agrees to establish the session, the terminating endpoint may then send a SIP "200 OK" message via the proxy server to the initiating endpoint. And the initiating endpoint may responsively send a SIP "ACK" message via the proxy server to the terminating endpoint. The endpoints may then begin to communicate RTP packets with each other.

Another way for two or more endpoints to establish and conduct a real-time media session with each other is through a communication server (e.g., a multipoint conference unit (MCU)). The communication server may function to set up respective RTP sessions ("legs") with each participating endpoint and to bridge together the legs so that the participants can communicate with each other.

For instance, an initiating endpoint may send to a proxy server an INVITE that requests an RTP session with one or more designated terminating endpoints, and the proxy server may forward the INVITE to the communication server. The communication server may then respond with a 200 OK to the initiating endpoint, and the initiating endpoint may respond with an ACK, thus establishing an RTP leg (initiating leg) between the initiating endpoint and the communication server.

At the same time, the communication server itself may send an INVITE via the proxy server respectively to each designated terminating endpoint and establish RTP legs (terminating legs) with each of those other endpoints. In turn, the communication server may bridge together the initiating leg with each of the terminating legs, so as to allow all of the endpoints to communicate with each other.

By establishing real-time media sessions in this manner between mobile stations, a wireless carrier can conveniently provide its subscribers with PTT service. In particular, each "PTT-capable" mobile station can preferably include a button or other actuating mechanism that a user can engage in order to initiate a PTT session with a designated group of one or more other users. When the user presses the PTT button, a PTT client application on the mobile station may responsively send an INVITE request to a proxy server. And the proxy server may forward the INVITE to a PTT server.

An SDP in the INVITE request may identify or list a "communication group" for the user, i.e., a group of other users with whom the initiating user would like to communicate. The PTT server may then set up RTP legs with the initiating user and with each member of the group. And the PTT server may then bridge together the communication legs in a designated manner, so as to allow the members of the group to communicate with each other and with the initiating user.

SUMMARY

Ideally, a PTT communication system should simulate instant 2-way radio communication. In particular, when a user initiates a PTT session, the user will want to be able to press the PTT button and immediately begin talking (or conveying other real-time media) to each other party "on the channel." Unfortunately, however, communications in the wireless environment can result in unacceptable call setup latencies on the order of 6 or even 10 seconds.

In general, call setup latency may arise on the initiating end and/or on each terminating end, because the initiating mobile station and/or each terminating mobile station may need to acquire radio resources before communication begins. Further, additional delay may ensue as the PTT server works to set up communication with the endpoints.

At the initiating end, for example, if the mobile station is dormant, the mobile station may need to request a radio-link traffic channel before it can begin communicating with the PTT server. And the process of requesting and waiting for a channel assignment can take some time.

As another example, once the initiating mobile station has acquired a traffic channel, the mobile station may send an initiation request (e.g., an INVITE) to the PTT server. And it may then take some time for the PTT server to set up an RTP leg with the initiating station as well as an RTP leg with each terminating station.

Further, if the initiating mobile station does not currently have a data-link layer (e.g., PPP) connection, additional delay may result as the mobile station interacts with the PDSN or other network entity to establish that connection.

In turn, for each terminating station, a BSC may receive a termination request, such as a request to send an INVITE or other packet data to a terminating station, and the BSC may responsively page the terminating station and await a response. This paging process can be the largest source of call-setup latency, because paging is normally carried out at only periodic time slots on the paging channel, typically about every 5 seconds, in order to conserve mobile station battery power. Thus, if the BSC receives the termination request right after one such slot has passed, the BSC would not send the page to the mobile station until about 5 seconds later, which clearly impacts call setup time.

In addition, once a dormant mobile station receives a page, the mobile station may respond to the page by requesting a traffic channel. And, as with the initiating end, this process of establishing a radio-link can add more delay.

Still further, once the terminating mobile station has acquired a traffic channel, the mobile station may receive and respond to the session initiation request from the PTT server, which, as noted above, may take additional time.

An exemplary embodiment of the present invention provides several mechanisms to overcome or reduce call setup latency, or to at least avoid or reduce the appearance of call setup latency from the user perspective. (From this point forward, any mention of reduction in call setup latency should be considered to mean an actual reduction in call setup latency and/or a reduction in the appearance of call setup latency from a user perspective.) These mechanisms can be used individually or, for a more robust solution, in combination with each other.

According to the exemplary embodiment, one way to reduce call setup latency is to buffer an initial media transmission until a link exists to transmit the media further. This solution stems from the fact that call setup latency will normally be unnoticeable to the terminating end, as long as the terminating end ultimately receives the initial media transmission. For instance, if a user initiates a PTT session and immediately speaks to a terminating user, but the terminating user does not begin to receive the voice signal until 5 seconds later, the terminating user normally would not realize that there was a 5 second delay.

In this respect, the initial media transmission can be buffered at one or more locations. By way of example, the media can be buffered in the initiating mobile station until the initiating mobile station acquires a traffic channel and establishes an RTP session with the PTT server (and perhaps until the PTT server has established the terminating RTP legs as well). The initiating mobile station may then programmatically transmit the buffered media along its way to the PTT server.

As another example, the initial media transmission can be buffered in the PTT server until the PTT server establishes an RTP leg with one or more terminating mobile stations.

The PTT server may then transmit the media along its way to the one or more terminating stations. Other examples are possible as well.

(Note that this buffering process differs from the buffering that is carried out commonly in telecommunications networks to reduce jitter. Jitter buffering functions to even out the spacing among packets so as to facilitate continuous playout of media at a receiving end. Jitter buffering does not function to hold a media signal until a link exists to transmit the media further.)

Also according to the exemplary embodiment, another way to reduce call setup latency is to switch to a higher paging frequency on the terminating end. For instance, in response to a user request and/or another designated triggering event, the system can change the paging frequency for a given mobile station to be about every 1 second, rather than about every 5 seconds. This way, the mobile station can more quickly receive a page and can thereby more quickly receive the incoming media transmission.

Granted, an increase in paging frequency will require the mobile station to monitor the paging channel more often and may therefore cause the mobile station to use more battery power. However, this change of paging frequency can be done on a case by case basis, affecting only certain mobile stations and/or affecting mobile stations at only designated times.

For example, a mobile station may have a "normal mode" in which the mobile station will not be engaging in PTT communication and a "PTT mode" in which the mobile station may engage in PTT communication. When the mobile station is in the normal mode, the BSC may be set to page the mobile station at a normal paging frequency, and the mobile station may be set to monitor the paging channel at that normal frequency, thereby conserving battery power at the expense of call setup latency. And when the mobile station is in the PTT mode, the BSC may be set to page the mobile station at a higher paging frequency, and the mobile station may be set to monitor the paging channel at that higher frequency, thereby reducing call setup latency.

Through a suitable user interface, a user of the mobile station may then direct the mobile station to switch from the normal mode to the PTT mode, or more generally to switch from one mode to another. And in response, the mobile station may send a control signal to the BSC (or to another network entity that might then pass a request to the BSC), directing the BSC to switch to the higher frequency paging cycle for that mobile station. The BSC may then set a flag for the mobile station, indicating that, when the BSC receives a terminating request for the mobile station, the BSC should page the mobile station at the higher frequency. Further, the mobile station may responsively begin monitoring the paging channel at the higher frequency.

Thus, when the BSC receives a termination request for the mobile station, the BSC will page the mobile station at the higher frequency. And the mobile station will then more quickly receive the page and request a traffic channel, which the BSC will assign. And the mobile station may then receive an incoming data transmission from the BSC.

Further, the system may switch back to a lower frequency paging mode for a given mobile station. For instance, in response to a user request or other designated event (e.g., a timeout of PTT mode), the mobile station may send a control signal that directs the BSC to switch to the lower frequency paging cycle for the mobile station. And the BSC and mobile station may accordingly switch to that lower frequency paging cycle.

These and other aspects and advantages of the exemplary embodiment will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

1. Exemplary Architecture

Figure 1:
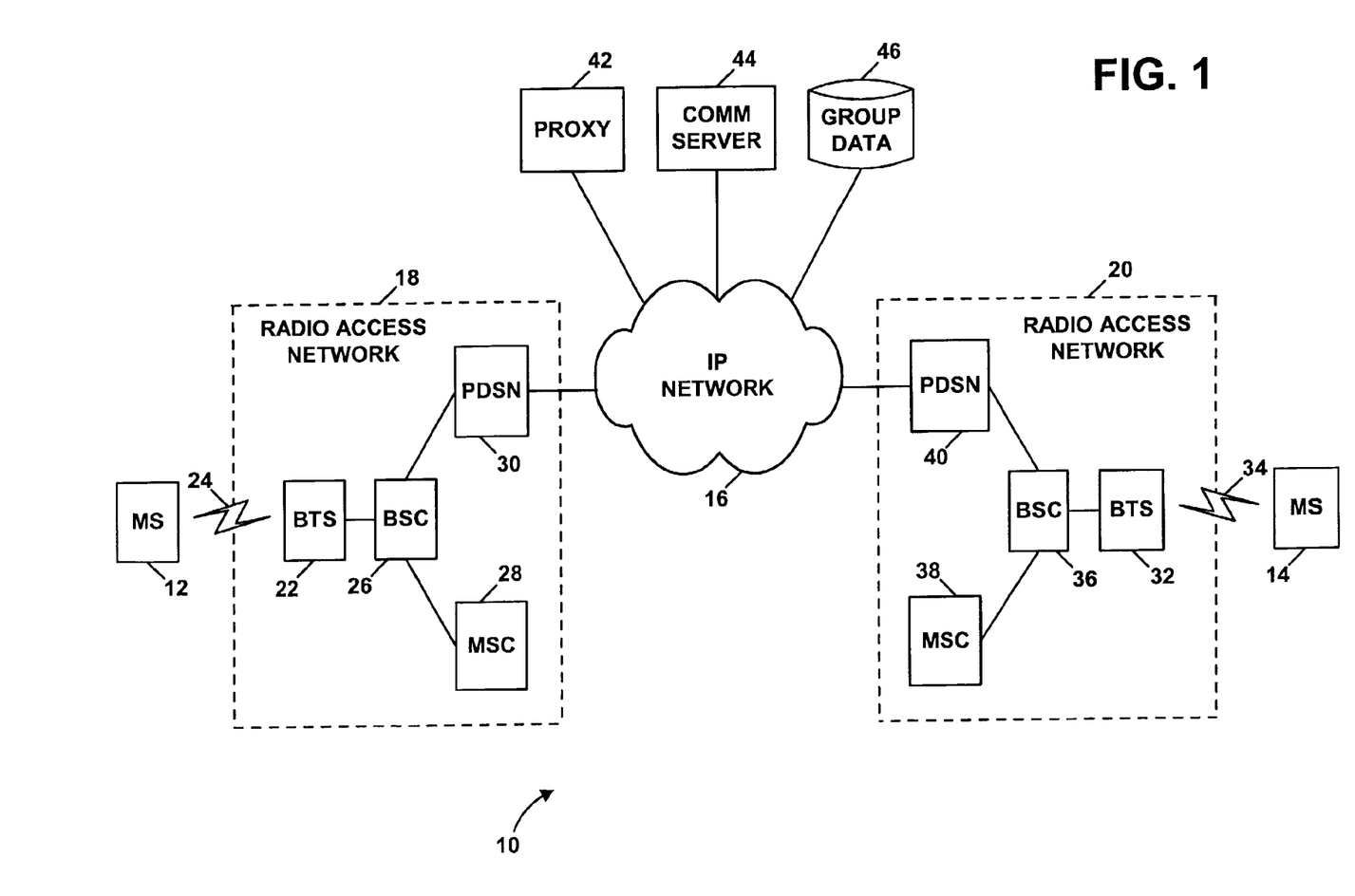
FIG. 1 is a block diagram illustrating a wireless communication system 10 in which the exemplary embodiment may be employed.

Referring to the drawings, FIG. 1 illustrates a wireless communications system 10 in which an exemplary embodiment of the present invention may be employed. It should be understood, however, that this and other arrangements and processes described herein are set forth for purposes of example only, and other arrangements and elements (e.g., machines, interfaces, functions, orders of elements, etc.) can be added or used instead and some elements may be omitted altogether. Further, as in most telecommunications applications, those skilled in the art will appreciate that many of the elements described herein are functional entities that may be implemented as discrete components or in conjunction with other components, in any suitable combination and location.

System 10 may include a number of mobile stations, such as exemplary mobile stations 12 and 14 for instance. Each mobile station (MS) can be linked by a radio access network with an IP network 16. As shown by way of example, MS 12 is linked by a first radio access network 18 with the IP network, and MS 14 is linked by a second radio access network 20 with the IP network. Alternatively, both MS 12 and MS 14 can be linked to the IP network by a common radio access network. Other alternatives are possible as well.

Each radio access network provides wireless connectivity with the IP network and can take any of a variety of forms. By way of example, radio access network 18 may include a BTS 22 that can communicate with MS 12 over an air interface 24. BTS 22 may then be coupled with a BSC 26, which may in turn be coupled with an MSC 28 and with a PDSN 30 or other gateway to the IP network 16. (At times, a BTS and BSC in combination may be referred to as a "base station.") Similarly, radio access network 20 may include a BTS 32 that can communicate with MS 14 over an air interface 34. BTS 32 may then be coupled with a BSC 36, which may in turn be coupled with an MSC 38 and with a PDSN 40 or other gateway to the IP network 16.

As another example, either or both of the radio access networks could comprise a base station that itself functions as a gateway with the IP network, without use of a PDSN or other gateway to the network. And as another example, MS 12 and MS 14 could communicate at least in part via a common radio access network, such as through a common PDSN, a common BSC and/or a common BTS. Other examples are also possible.

As further shown in FIG. 1, a number of other entities may be coupled with (or may sit as nodes on) IP network 16. These other entities may include a proxy server 42, a communication server 44, and a group data store 46. The proxy server 42 can be a SIP proxy server that functions to receive and forward SIP signaling messages, such as SIP INVITE requests. (For instance, the SIP proxy server may receive an INVITE from MS 12 and forward the INVITE to communication server 44 for processing.) The communication server 44, in turn, may be a PTT server that functions to establish and carry PTT sessions between MS 12 and MS 14 and/or between other stations linked with IP network 16. And the group data store 46 may define groups of subscribers set to communicate with each other.

These entities may be arranged in any of a variety of ways. For example, group data store 46 may reside on a discrete database server that is coupled with the IP network 16 and that is accessible by communication server 44. Or group data store 46 may reside within communication server 44 or proxy server 42. And as another example, the function of proxy server 42 may be integrated with the function of communication server 44. Other examples are also possible.

As a general matter, each MS in FIG. 1 can establish a packet-data communication over IP network 16, by establishing a radio link over an air interface, establishing a data link with a PDSN or other gateway, and sending or receiving packet-data via those links. For instance, MS 12 may request a traffic channel on air interface 24, and BSC 26 may responsively instruct MS 12 to operate on a given traffic channel. Through that traffic channel, MS 12 may then negotiate with PDSN 30 to set up a PPP session and to obtain an IP address, so that MS 12 can engage in IP communications over network 16. (Alternatively, as noted above, a MS can obtain an IP address in some other way, such as from a mobile-IP home agent.) Similarly, MS 14 may acquire a traffic channel on air interface 34 and may establish a PPP session with PDSN 40 and obtain an IP address, so that it too can engage in IP communications over network 16. MS 12 and MS 14 may then communicate with each other or with other entities on network 16 via their respective radio-links and their respective network-links.

Figure 2:
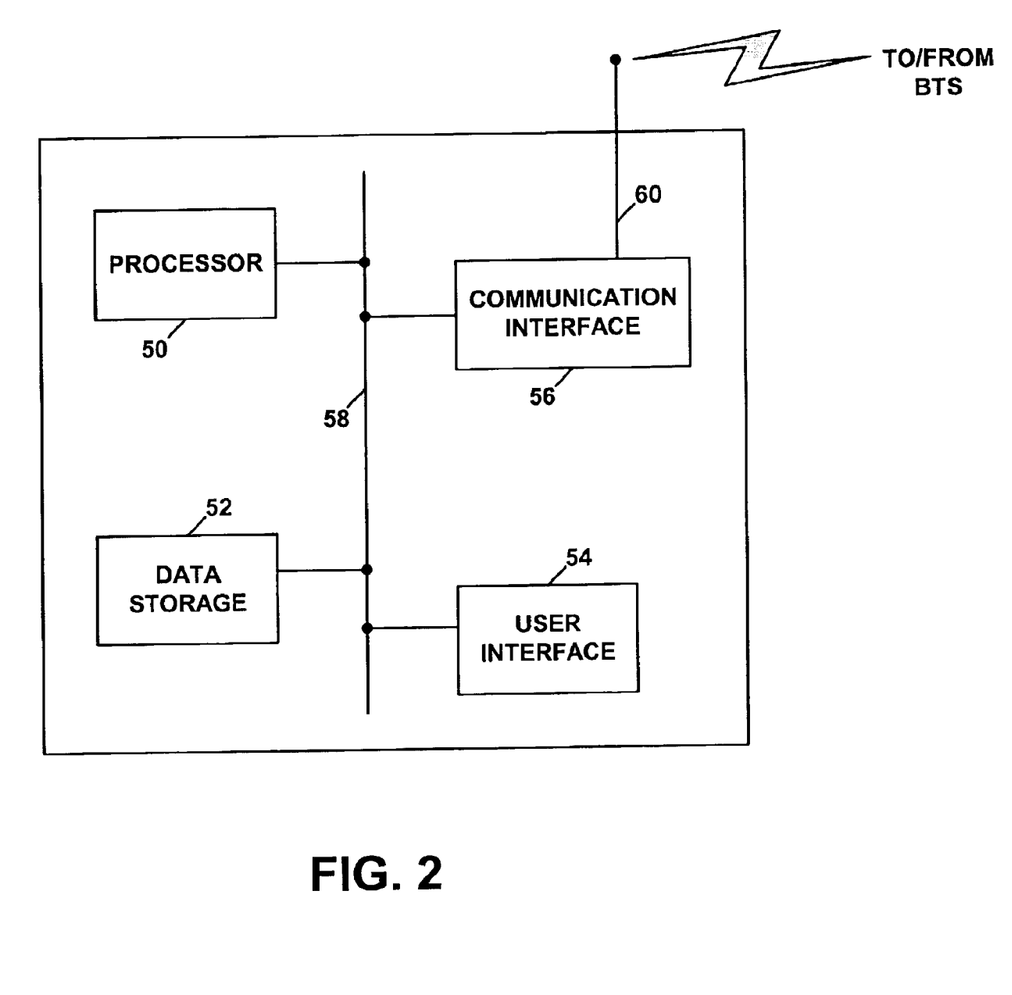
FIG. 2 is a block diagram depicting an exemplary mobile station.

MS 12 and MS 14 may each take various forms and may be the same as or different than each other. To help illustrate, FIG. 2 is a simplified block diagram depicting an exemplary mobile station. As shown in FIG. 2, the exemplary mobile station includes a processor 50, data storage 52, a user interface 54, and a wireless communication interface 56, all of which may be coupled together by a system bus 58.

Each of these components may take various forms, the particular details of which are not necessarily critical. For instance, processor 50 may be an Intel Pentium class processor or a digital signal processor (which may integrate part or all of data storage 52) and data storage 52 may be flash memory and/or a storage drive.

User interface 54 may then facilitate interaction with a user. As such, the user interface may include media input and output mechanisms. To facilitate voice communications, for instance, these mechanisms might include a microphone (not shown) for receiving analog speech signals from a user, and a speaker (not shown) for playing out analog speech signals to a user. (Further, the mobile station will likely include digital/analog conversion circuitry (not shown) for converting between analog media signals and digital representations of those signals.)

In addition, the user interface may include a display, speaker or other mechanism (not shown) for presenting information and menus to a user, as well as an input mechanism (e.g., keyboard, keypad, microphone, mouse, and/or touch-sensitive display overlay) (not shown) for receiving input from a user. For PTT functionality, the input mechanism may also include a PTT button (not shown) or other mechanism that a user can readily engage in order to initiate PTT communication.

Wireless communication interface 56, in turn, may facilitate communication over an air interface with a respective base station. As such, the wireless communication interface may include an antenna 60 for sending and receiving signals over the air interface.

In the exemplary embodiment, data storage 52 holds a set of logic (e.g. computer instructions) executable by processor 50 to carry out various functions described herein. (Alternatively, the logic may be embodied in firmware and/or hardware.) For example, the logic may function to establish a radio link and a data link, automatically when the mobile station is powered on, or in response to a user request, a termination request or another triggering event.

The manner in which the mobile station establishes a data session might vary depending on the protocol used for communication over the air interface. In the exemplary embodiment, the air interface will be a code division multiple access (CDMA) air interface, and MS-BTS communications over the air interface will comply with an industry standard such as EIA/TIA/IS-2000a ("IS-2000"), as published by the Electronics Industry Association/Telecommunications Industry Association, define a suitable CDMA protocol. However, the air interface could take other forms as well. (Examples include TDMA and GSM.)

Under IS-95, to establish a data session, the mobile station may send an origination message over the air interface to the MSC (via the BTS and BSC), and the origination message can include a "packet data" service option code and designate a network address of a destination entity with which the mobile station wants to communicate. When the MSC receives the origination message, it will responsively instruct the BSC to pass the origination message to the PDSN. The mobile station will then receive from the BSC a traffic channel assignment, defining a radio link over which the MS and BSC may communicate. And the mobile station will then negotiate with the PDSN to set up a PPP packet-data session and to acquire an IP address.

As another example, the logic may facilitate monitoring a paging channel at a designated slot cycle in order to detect an incoming page, and the logic may facilitate providing communication interface 46 with control signals to send to a BSC, to an MSC and/or to another entity, so as to establish a radio link and/or a data link.

And as another example, the logic may facilitate set up and tear down of communication sessions. For instance, the logic may respond to user actuation of the PTT button, by establishing a radio link and/or data link (if they do not yet exist) and sending a SIP INVITE or other session initiation request to proxy server 42, for transmission in turn to communication server 44. And the logic may facilitate receipt of and response to a session initiation request, where another entity has sought to initiate a session. To facilitate these functions, the logic may define a SIP client application.

In addition, the logic may facilitate sending, receiving and playout of media signals. In this regard, for instance, the logic may encode and packetize outgoing media signals as RTP/UDP/IP (or perhaps RTP/TCP/IP) packets for transmission via communication interface 56 and via the radio link and data link to one or more other entities on IP network. And the logic may depacketize and decode incoming media signals provided by communication interface 56 and may pass the decoded signals to one or more media output mechanisms for playout.

Further, the logic may facilitate interaction with a user through user interface 54. As such, the logic might define user interface scripts (e.g., XML scripts). And the logic may function to pass those scripts to user interface 54 for presentation to a user. Further, the logic may function to receive user input (such as selections made in response to the user interfaces) from user interface 54 and to respond accordingly.

In addition, in accordance with the exemplary embodiment, data storage 52 will preferably include buffer space for temporarily holding a real-time media signal, such as packet-data that represents an outgoing initial media transmission. And the logic will function to buffer outgoing media signals, at least until a transmission path exists to send the signals along their way.

Further, data storage 52 will preferably include a flag or other indicator that reflects a mode of operation of the mobile station and/or a corresponding paging "slot cycle index" to be used by the mobile station.

A slot cycle index reflects which time slot(s) of the air interface paging channel will carry a page signal when the mobile station is being paged. Under current industry standards, slot cycle index 0 (zero) would provide a page signal every 1.28 seconds. Thus, when operating at slot cycle index 0, a mobile station would have to "wake up" every 1.28 seconds and check the paging channel to determine whether the mobile station is being paged. In contrast, slot cycle index 2 would provide a page signal every 5.12 seconds. So, when operating at slot cycle index 2, a mobile station would have to wake up and check the paging channel far less often, thereby using less battery power.

Additionally, the logic may function to allow a user to select a slot cycle index to use, such as through interaction with a suitable user interface. And the logic may function to update the slot cycle index flag in data storage 52. This logic may take various forms. For example, the logic may allow a user to specifically request slot cycle index 0 or slot cycle index 2 (or some other slot cycle index). And in response, the logic may function to update the slot cycle index flag in data storage 52, to reflect the new slot cycle index for the mobile station.

As another example, the logic may allow a user to select a mode of operation of the mobile station, and the logic may correlate that mode of operation with a particular slot cycle index. For instance, the logic may define a "fast page mode" and a "normal page mode." If the user selects the fast page mode, the logic may set the mobile station at slot cycle index 0. And if the user selects the normal page mode, the logic may set the mobile station at slot cycle index 2. Similarly, the logic may define a "PTT mode" (or "instant chat" mode) and a "normal mode." If the user selects the PTT mode, the logic may set the mobile station at slot cycle index 0. And if the user selects the normal mode, the logic may set the mobile station at slot cycle index 2. Other examples are also possible.

Additionally, the logic will preferably function to notify the BSC when the mode of operation of the mobile station changes and/or more specifically when the slot cycle index to be used for paging the mobile station changes. That way, the BSC can become set to page the mobile station at the designated slot cycle index.

In this regard, IS-95 provides several user-definable fields for messaging over the access channel from a mobile station to a BSC. In response to a user request or in response to some other triggering event, the mobile station might use one of those fields to send a message to the BSC.

The message might indicate specifically the new slot cycle index to be used for paging the mobile station. Alternatively, the message might indicate the mode of operation of the mobile station (e.g., fast page mode, normal page mode, PTT mode, or normal mode). And the BSC might be arranged to correlate that mode with a respective slot cycle index, just as the mobile station correlates the mod with that slot cycle index.

Each BTS, BSC, MSC, and PDSN shown in FIG. 1 can largely be a conventional component of a radio access network, such as may be provided by Sprint PCS for instance. Therefore, these components are not described here in detail. (As examples, each BTS can be a Motorola SC4812, SC611, SC614 or SC4850, each BSC can be a Nortel BSS or a Motorola CBSC, each MSC can be Lucent 5ESS, and each PDSN can be a Nortel Shasta 5000 or a CommWorks Total Control 1000. Other examples are also possible.)

In accordance with the exemplary embodiment, each BSC may further function to maintain a record of a slot cycle index to be used for each mobile station that the BSC serves. As such, the BSC might maintain in memory a profile record for each mobile station. The profile record may directly correlate each mobile station's Electronic Serial Number (ESN) and/or Mobile Identification Number (MIN) with a corresponding slot cycle index. Alternatively, the profile record may correlate each MS with a current mode of the mobile station, and other BSC logic may indicate which slot cycle index to use for that mode. Still alternatively, the BSC might be programmed to use a default slot cycle index for all mobile stations, unless a record indicates otherwise.

In addition, the BSC will preferably include logic to be able to receive a message from a mobile station indicating a change in mode of operation or more specifically a change in slot cycle index to be used for the mobile station. And the BSC will be programmed to update the stored record of slot cycle index and/or mode for that mobile station. As indicated above, this control communication between the mobile station and the BSC can occur through user-definable fields over the access channel, or in other ways.

In turn, proxy server 42, communication server 44 and group data store 46 can also take various forms. For example, proxy server 42 can comprise a SIP proxy server application running on a computer at a defined IP address on network 16. As such, the computer could function strictly as a SIP proxy server. Or it could be a more complex platform, such as a "service agent" that manages all packet-data communications involving mobile stations. Functions of an exemplary service agent are described in co-pending, co-owned U.S. patent applications Ser. No. 09/708836 (filed Nov. 8, 2000) and Ser. No. 60/267667 (filed Feb. 9, 2001), the entirety of each of which are hereby incorporated by reference.

Figure 3:
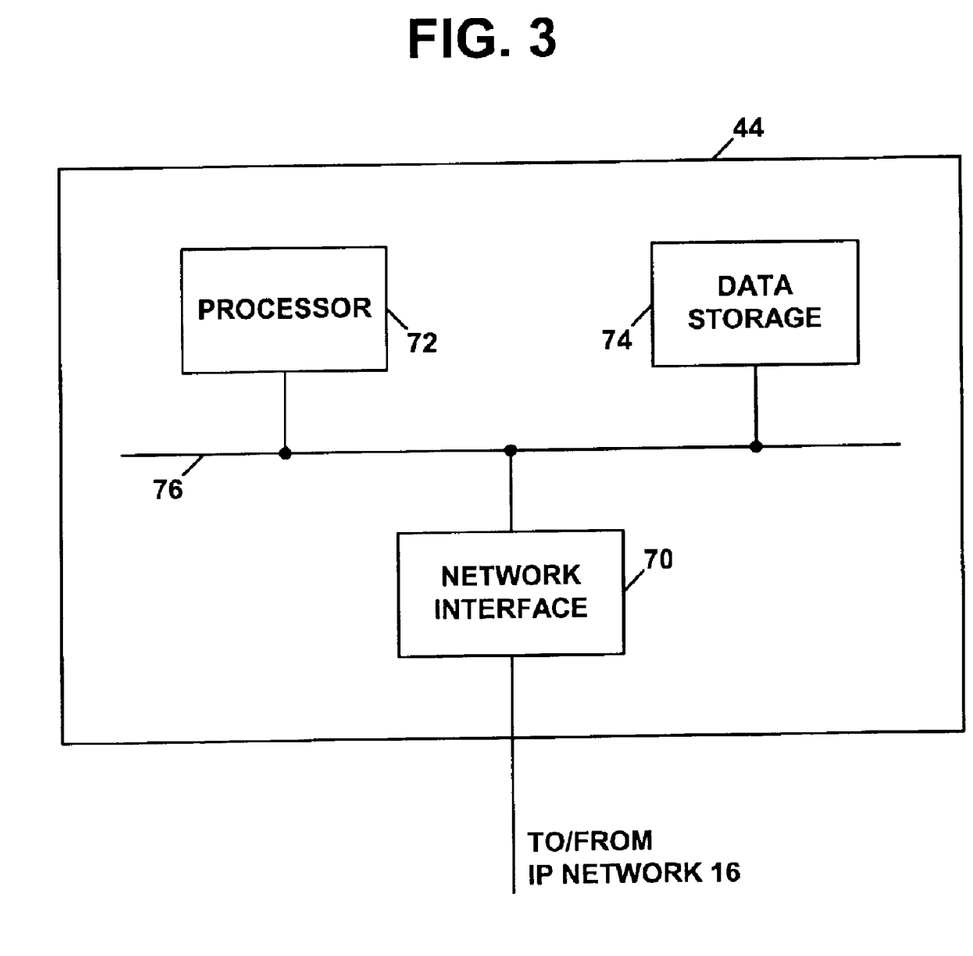
FIG. 3 is a block diagram depicting an exemplary communication server.

Communication server 44, in turn, may be a conferencing server that also sits at a defined address on IP network. Referring to FIG. 3, a generalized block diagram of a representative server 44 is shown. As illustrated, exemplary server 44 includes a network interface unit 70, a processor 72, and data storage 74, all tied together via a system bus 76.

Network interface unit 70 functions to provide connectivity with IP network 16. As such, network interface unit 70 may receive packets from the IP network and may route packets independently over the IP network to designated IP addresses. A suitable network interface unit is the 3Com EdgeServer card, but other examples are also possible.

Data storage 74, in turn, preferably holds machine language instructions and/or other logic executable by processor 72 to carry out various functions described herein. (Alternatively, some such functions could be carried out by hardware and/or firmware).

For example, data storage 74 may include logic to set up and tear down communications with client stations such as MS 12 and MS 14. This logic can vary depending on the type of links and protocols used for communication. By way of example, the logic could be a SIP client application. As such, it could receive an INVITE request from one of the mobile stations, which seeks to set up a group communication session. In response, the logic may refer to group data store 46 to identify one or more subscribers of the group. And the logic may then send INVITE requests of its own to proxy server 42 for transmission in turn to each subscriber's mobile station, and to ultimately set up communications respectively between itself and each mobile station, as described above. Further, at the end of a group session, the SIP client application can function to tear down communications with each mobile station.

As another example, the logic may function to communicate real-time media signals with the mobile stations. Again, this logic can vary depending on the type of links and protocols that are employed. For instance, the logic might function to communicate according to the UDP/IP (or TCP/IP) and RTP protocols.

Further, the logic may function to bridge together communications between the various mobile stations. Similarly, this logic could vary depending on the type of protocols employed. For instance, assuming each client station communicates signals as UDP/IP packets, the logic might function to depacketize and uncover the underlying signals received from each client station, to combine the signals together (or select a strongest signal), and to re-packetize and transmit the resulting signal out to the stations.

In addition, data storage 74 will preferably include buffer space for temporarily holding real-time media signals, such as packet-data that represents outgoing media transmissions. And the logic will function to buffer a media signal upon initiation of a communication session, at least until a transmission path exists to send the signals along their way.

2. Exemplary Operation

As indicated above, call setup latency can be reduced by buffering an initial media transmission until it can be transmitted further and/or by increasing the page frequency at the terminating end. These processes will be described in the following sections.

a. Reducing Call Setup Latency by Buffering an Initial Media Transmission

Figure 4:
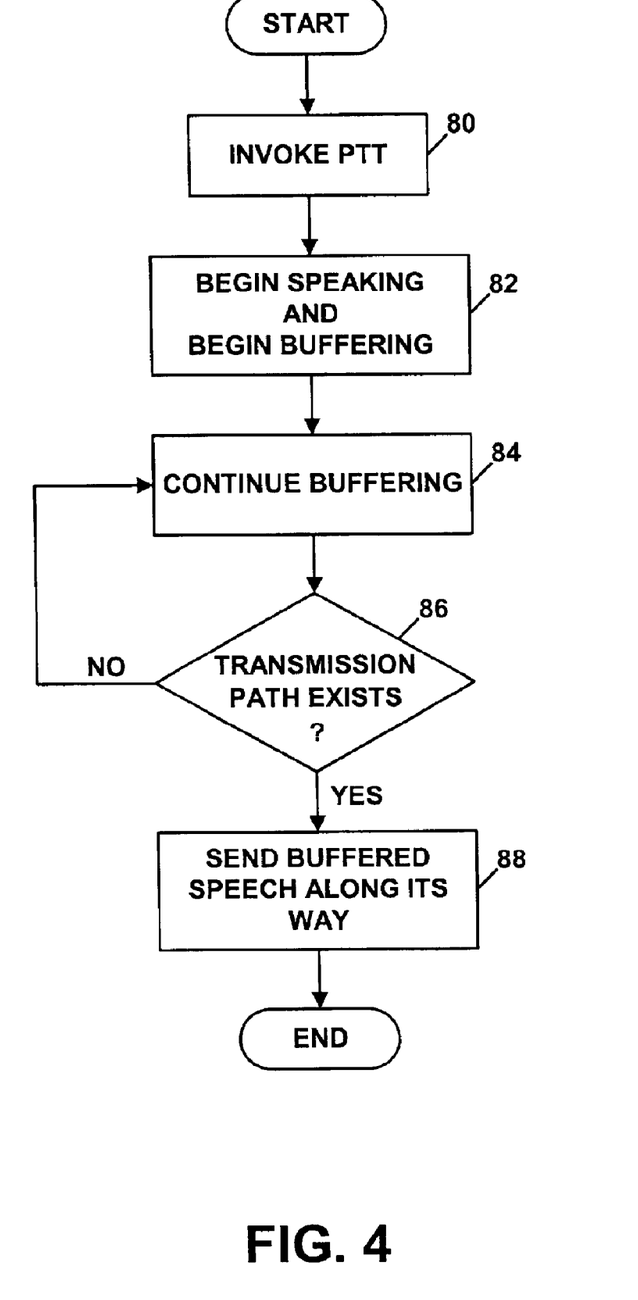
FIG. 4 is a flow chart depicting functions that can be carried out to reduce call setup latency by buffering an initial media signal in accordance with the exemplary embodiment.

Referring to FIG. 4, a generalized flow chart is provided to help illustrate a set of functions that can be carried out to reduce call setup latency by buffering an initial media transmission. For purposes of example, this description will assume that a user of MS 12 (the initiating user) seeks to initiate a PTT session with a user of MS 14 (the terminating user)

As shown in FIG. 4, at block 80, the initiating user invokes a PTT session, such as by pressing a PTT button on MS 12. At block 82, the initiating user begins speaking and an entity (such as MS 12 or PTT server 44, for instance) begins buffering the initiating user's speech. At block 84, the entity continues to buffer the user's speech. And at block 86, the entity determines whether a transmission path exists to send the user's speech along its way. If no transmission path exists, the process returns to block 84, where the entity continues to buffer the user's speech. Alternatively, once a transmission path exists, the process proceeds to block 88, where the entity sends the buffered speech along its way. Note that, if the initiating user continues to speak once the entity has begun transmitting the buffered speech, the entity can continue to buffer the user's current speech and can transmit the speech with a time delay, so as to maintain continuity.

Figure 5:
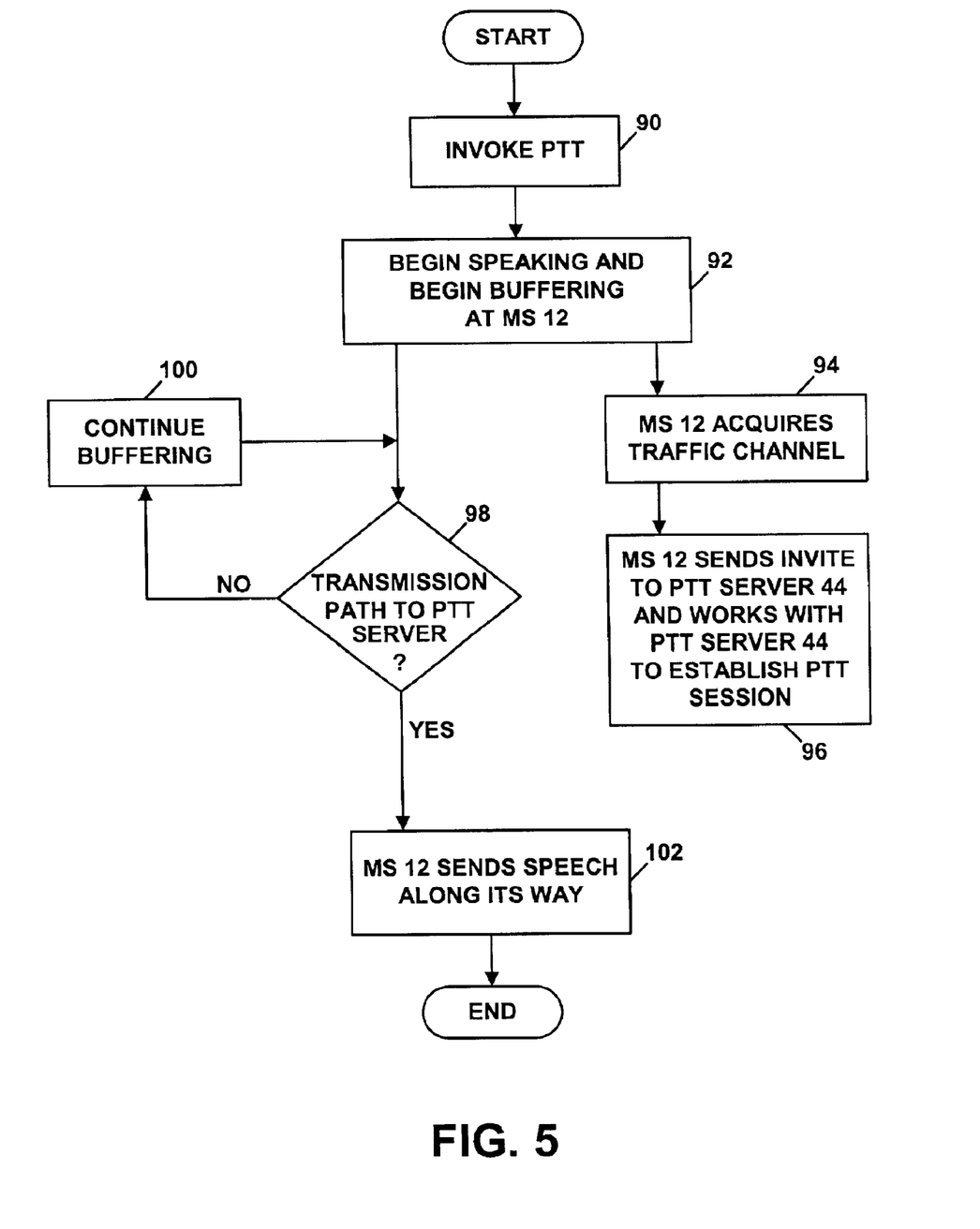
FIG. 5 is a flow chart depicting functions that can be carried out in buffering media at an initiating station.

Referring now to FIG. 5, a more specific flow chart is shown, to help illustrate how the exemplary buffering process may be carried out at the initiating end. For purposes of example, this description will assume that MS 12 has established a network connection and is currently dormant (i.e., its radio-link has timed out).

As shown in FIG. 5, at block 90, the initiating user invokes a PTT session, such as by pressing a PTT button on MS 12. At block 92, the user begins speaking and MS 12 begins buffering the user's speech. At block 94, MS 12 seeks to acquire a traffic channel, such as by sending a request message to BSC 26 over an air interface access channel, and BSC 26 assigns the traffic channel. In turn, at block 96, MS 12 works with PTT server 44 to establish a PTT session. For instance, MS 12 may send to PTT server 44, via proxy server 42, a SIP INVITE, and PTT server 44 may then work to set up an RTP leg with MS 12 and an RTP leg with MS 14, which PTT server 44 may then bridge together.

Meanwhile, MS 12 may continue to buffer the user's speech until a transmission path exists over which MS 12 can send the buffered speech along its way. In this example, the transmission path could be an RTP leg between MS 12 and PTT server 44. Thus, at block 98, MS 12 can determine whether an RTP leg yet exists between MS 12 and PTT server 44. If the RTP leg does not exist, then, as shown at block 100, MS 12 may continue to buffer the user's speech. Alternatively, in response to establishment of the RTP leg between MS 12 and the PTT server, MS 12 may begin transmitting the buffered speech signal along its way to the PTT server, as shown at block 102.

Notice that the extent to which MS 12 will wait for an RTP leg (or other such transmission path) to exist can be effectively managed by the PTT server, since the PTT server has control over establishing the RTP leg with MS 12. In this regard, the PTT server may establish the RTP leg with MS 12 before the PTT server establishes an RTP leg with MS 14. (For instance, as soon as the PTT server receives an INVITE from MS 12, the PTT server can respond to MS 12 and set up the initiating RTP leg.) Or the PTT server may establish the RTP leg with MS 12 only after the PTT server establishes the RTP leg with MS 14. (For instance, before the PTT server responds to an INVITE from MS 12, the PTT server can send an INVITE to MS 14 and work to set up an RTP leg with MS 14, after which the PTT server can then finish establishing an RTP leg with MS 12.)

Figure 6:
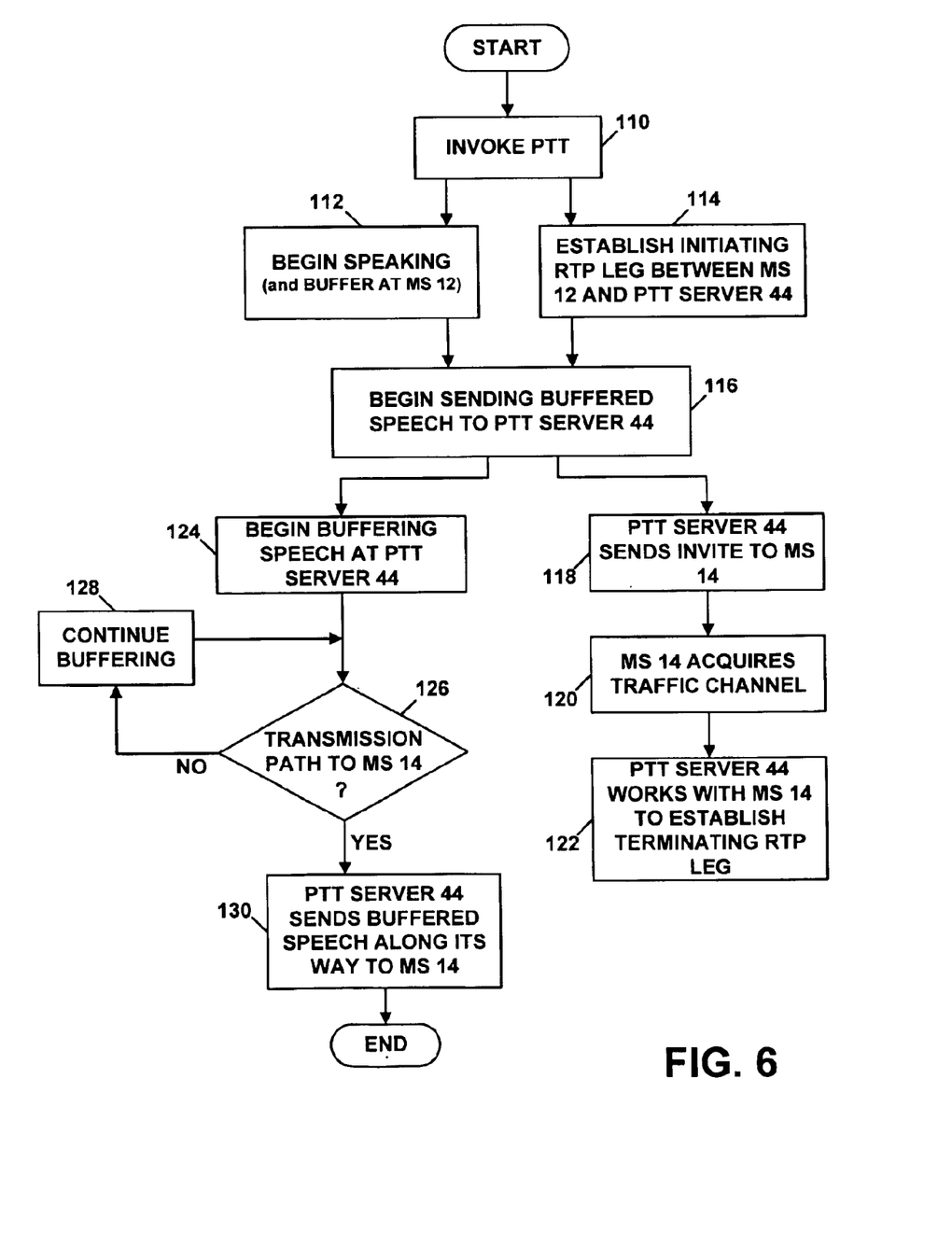
FIG. 6 is a flow chart depicting functions that can be carried out in buffering media at a communication server.

Referring next to FIG. 6, another more specific flow chart is shown, to help illustrate how the buffering process may be carried out at the PTT server, instead of or in addition to buffering at MS 12. For purposes of this example, the description will assume that, like MS 12, the terminating MS 14 has established a network connection and is dormant.

As shown in FIG. 6, at block 110, the initiating user invokes a PTT session, such as by pressing a PTT button on MS 12. At block 112, the user may then begin speaking. And MS 12 might carry out a buffering process such as that shown in FIG. 5 and described above. Meanwhile, at block 114, MS 12 may acquire a traffic channel and work with PTT server 44 to establish at least an initiating RTP leg between MS 12 and PTT server 44. At block 116, MS 12 may then begin sending the speech (whether or not it was buffered at MS 12) to PTT server 44.

At block 118, PTT server 44 may send a session initiation message, such as a SIP INVITE to terminating MS 14. When that SIP invite reaches BSC 36, BSC 36 will note that MS 14 is dormant, so BSC 36 will page MS 14 on an air interface paging channel. At block 120, MS 14 will then acquire a traffic channel, such as by sending a request message to BSC 36 over an air interface access channel and then receiving a channel assignment from BSC 36. At block 122, MS 14 would then receive the INVITE and would work with PTT server 44 to establish a terminating RTP leg between PTT server 44 and MS 14.

Meanwhile, at block 124, PTT server 44 may buffer the initiating user's speech signal until a transmission path exists over which PTT server 44 can send the buffered speech signal along its way. In this example, the transmission path could be a terminating RTP leg between PTT server 12 and MS 14. Thus, at block 126, PTT server 44 can determine whether an RTP leg yet exists between PTT server 44 and MS 14. If the RTP leg does not exist, then, as shown at block 128, PTT server may continue to buffer the initiating user's speech. Alternatively, in response to establishment of the RTP leg between the PTT server and MS 14, the PTT server may begin transmitting the buffered speech signal along its way to MS 14, as shown at block 130.

(Note that if there were multiple terminating mobile stations, rather than just MS 14, PTT server 44 might be arranged to buffer the initiating user's speech signal until terminating RTP legs with all of those terminating stations had been established. Alternatively, the PTT server could release the buffered speech respectively to each terminating mobile station as an RTP leg with that station is established.)

This buffering arrangement will add delay to the time that it takes to send the initiating user's initial speech signal to the terminating user. Advantageously, however, the terminating user would not notice the delay if this is done only with the initial transmission. Once the terminating user receives that initial transmission, the terminating user can then respond to the initiating user. And the initiating user would likely attribute to the terminating user any delay between the time the initiating user spoke and the time the terminating user spoke. From that point forward, PTT communication can then continue normally.

As mentioned above, this buffering process can be carried out at other locations along the transmission path, instead of or in addition to buffering at the initiating MS and/or at the PTT server. Further, this buffering process can be carried out in a variety of other arrangements as well. For instance, the process can usefully be extended to apply when either or both of the client stations are landline stations (e.g., Ethernet/SIP phones) rather than mobile stations. Further, the arrangement could be as simple as a direct or networked connection between an initiating station and a terminating station, where the initiating station or an intermediate entity buffers media until a transmission path exists to send the media along its way.

Still further, the network connection could be circuit-switched instead of, or in addition to, packet-switched. For instance, MSC 28 and MSC 38 could be linked by a circuit-switched telephone network to a conference bridge. The conference bridge could then provide a function akin to that provided by the PTT server described above. In that case, industry standard ISUP signaling or some other signaling might be used to set up the communication legs.

And yet further, the foregoing process can be extended to apply with any real-time media signal being communicated from an initiating station to a terminating station. For instance, if MS 12 is capable of sending video and MS 14 is capable of receiving video, the above process could be applied to buffer the video in MS 12 until a transmission path exists to send the video along its way. And a PTT server (or perhaps a Push to View (PTV) server) could similarly buffer video provided by MS 12 until a transmission path exists over which the server could send the video along its way to MS 14. Other examples are also possible.

b. Reducing Call Setup Latency by Increasing Paging Frequency at a Terminating Mobile Station Referring now to FIG. 7, a flow chart is provided to help illustrate a set of functions that can be carried out to reduce call setup latency by selectively increasing paging frequency at a terminating mobile station.

Figure 7:
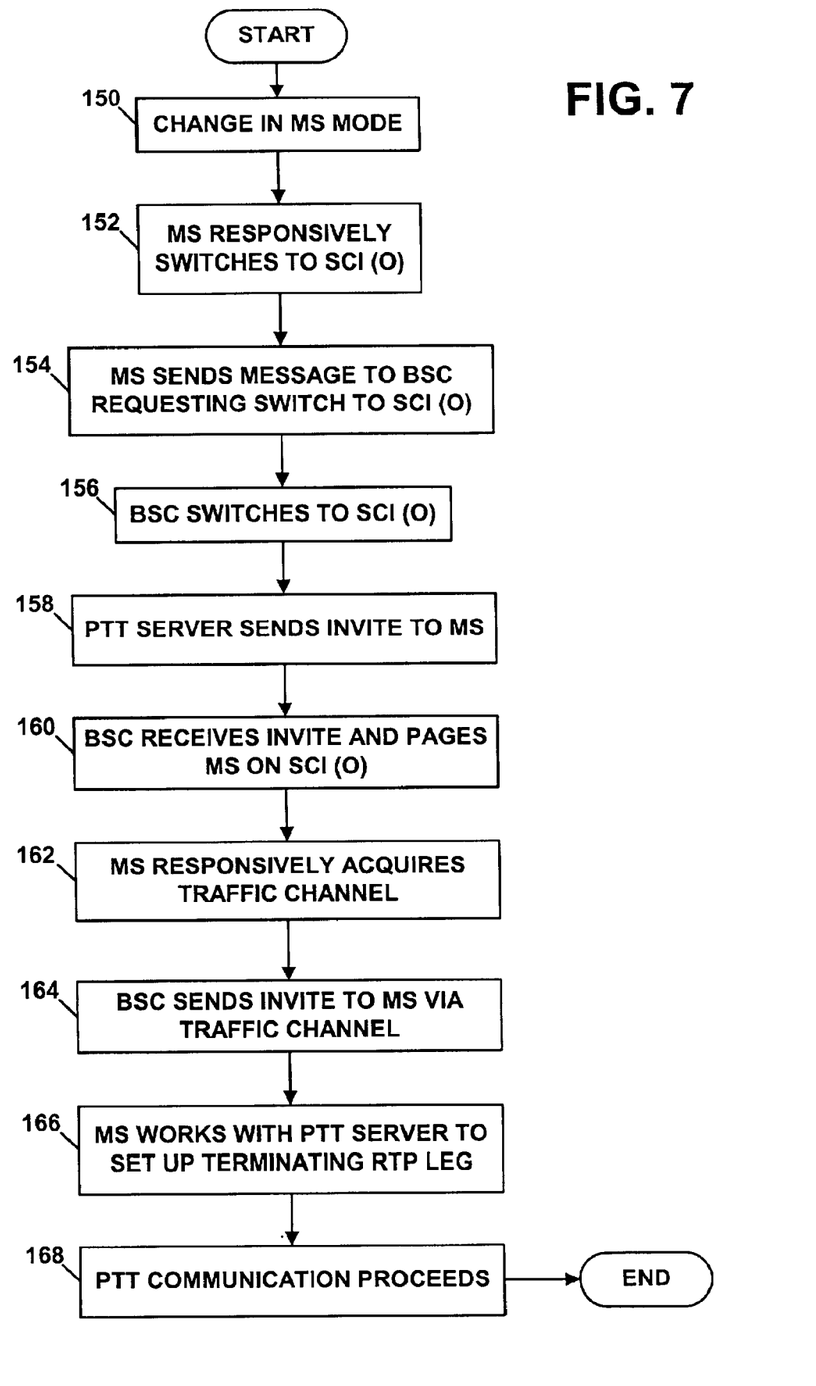
FIG. 7 is a flow chart depicting functions that can be carried out to change call setup latency by changing the paging frequency used to page a terminating station.

For purposes of example, this description will assume that MS 14 and BSC 36 are currently set to operate on slot cycle index 2. For instance, MS 14 might be in a "normal mode" or a "normal page mode" of operation, which might correlate with slot cycle index 2. As noted above, at this slot cycle index, BSC 36 would page MS 14 every 5.12 seconds. Thus, when MS 14 is dormant, MS 14 would wake up and check the page channel only every 5.12 seconds.

As shown in FIG. 7, at block 150, through interaction with a user interface of MS 14, a user of MS 14 may request a change in mode of operation of MS 14, or the MS may otherwise receive or detect such a request. The request may take various forms. For example, the request may be specifically a request to change the slot cycle index from 2 to 0. As another example, the request may more generally be a request to increase paging frequency, such as a request to switch from a normal page mode to a fast page mode.

And as still another example, the request may more generally be a request to switch from a normal mode to a PTT mode. For instance, when a user of MS 14 wants to become eligible to participate in PTT sessions, the user might select "PTT mode" or the like from a menu on MS 14. In response, MS 14 might begin running a PTT client application, which might send a REGISTER message to a presence server on IP network 16. (The server might then record that the user is online, and PTT server 44 might refer to the presence server to determine that MS 14 is online and available to engage in a PTT session.) At the same time, MS 14 may treat the user's request to enter the PTT mode as a request to switch to slot cycle index 0, so as to allow for quicker setup of PTT sessions with MS 14.

At block 152, once MS 14 receives the request for a change in mode of operation, MS 14 will responsively switch to operate on slot cycle index 0. Further, at block 154, MS 14 will responsively send a message to BSC 36, directing BSC 36 to switch to slot cycle index 0 for MS 14 as well. (Alternatively, MS 14 might send to BSC 36 a signal indicating change in mode of operation from a first mode to a second mode, and BSC 36 may construe that as a directive to begin operating on slot cycle index 0 when paging MS 14.) At block 156, BSC 36 will then begin operating on slot cycle index 0 for MS 14 as well.

Thus, when MS 14 is dormant, MS 14 will wake up and check the page channel every 1.28 seconds. And when BSC 36 receives a termination request for MS 14, BSC 36 will page MS 14 every 1.28 seconds.

Although MS 14 might use more battery power by having to check the paging channel more often in this new mode of operation, other mobile stations might be unaffected by this change. Thus, if most mobile stations that are served by BSC 36 are operating on slot cycle 2 (e.g., in a normal mode, rather than in a PTT-mode), those mobile stations will continue to better conserve their battery power. MS 14 might suffer a loss in battery power. But MS 14 will gain the ability to more quickly terminate PTT sessions, thereby reducing call setup latency.

Thus, continuing in FIG. 7, at block 158, PTT server 44 may send an INVITE to MS 14. At block 160, BSC 36 would receive the INVITE and would then page MS 14 on slot cycle index 0. At block 162, MS 14 would then quickly awake and acquire a traffic channel. And, at block 164, BSC 36 would send the INVITE via the traffic channel to MS 14. At block 166, MS 14 may then work with PTT server 44 to set up a terminating RTP leg. And, at block 168, PTT communication may proceed.

In turn, according to the exemplary embodiment, MS 14 could then switch back to a lower paging frequency. This could occur automatically upon expiration of a predefined time period. (BSC 36 could monitor this time period and, upon expiration of the time period, could switch to slot cycle index 2 and could direct MS 14 to do the same. Or MS 14 could monitor this time period and, upon expiration of the time period, could switch to slot cycle index 2 and could direct BSC 36 to do the same.)

Alternatively, MS 14 could change to a lower frequency paging cycle (e.g., switching back to slot cycle 2) in response to a user request, similar to how the MS could switch to a higher frequency paging cycle as described above. For instance, the user of MS 14 might close a PTT application on MS 14, which trigger a change to slot cycle index 2. Or the user might more expressly request a change to slot cycle 2 or a change to a lower paging frequency, which may similarly trigger a change to slot cycle index 2.

Note that many variations on this arrangement are possible. For example, the process is not necessarily restricted to use of slot cycle indexes 0 and 2. More generally, the MS and BSC might switch from a first paging frequency to a second paging frequency, in response to any of a variety of triggering events.

Additionally, the process could involve establishing a paging frequency that is even higher than existing slot cycle 0, so as to page more often than every 1.28 seconds. A new, lower slot cycle could be used specifically for PTT communications or other communications that could benefit from faster setup time.

Further, this process is not necessarily restricted to use in connection with PTT communications. The process could be extended to generally allow a switch in paging frequency for a mobile station. Advantageously, at any time, a switch to a higher paging frequency can decrease call setup latency while exhausting more battery power, while a switch to a lower paging frequency can help conserve battery power while increasing call setup latency. Additionally, this process can apply regardless of whether the initiating station is a mobile station.

Further, note that this process of increasing the paging frequency at the terminating end could be combined together with the buffering process described above. Separately, these processes should each help to decrease call setup latency. Together, they should greatly reduce call setup latency.

3. Conclusion

An exemplary embodiment of the present invention has been described above. Those skilled in the art will understand, however, that changes and modifications may be made to this embodiment without departing from the true scope and spirit of the present invention, which is defined by the claims.

We claim:

1. In a mobile station of the type comprising a processor, data storage, a wireless communication interface and a user interface, wherein the wireless communication interface comprises an antenna and is arranged to send and receive signals over a radio frequency air interface in communication with a base station, and wherein the user interface comprises a microphone for receiving analog speech signals from a user, a speaker for playing out analog speech signals to the user, a display for presenting information to a user, and a mechanism engageable by a user in order to initiate push-to-talk (PTT) communication, a method of reducing call setup latency comprising:

receiving into the mobile station, from the user, a request to change a mode of operation of the mobile station from a normal mode to a PTT mode;

responsive to the request, (i) the mobile station switching from operation at a first paging slot cycle index to operation at a second paging slot cycle index, wherein the mobile station checks a paging channel for pages more often when operating at the second paging slot cycle index than when operating at the first paging slot cycle index, and (ii) the mobile station sending a signaling message via an air interface to a base station controller, directing the base station controller to switch to operating at the second paging slot cycle index as well, whereby both the base station and the mobile station then operate at the second paging slot cycle index;

the mobile station receiving and buffering a speech signal provided by the user;

the mobile station setting up an initiating communication leg with a PTT server; and responsive to establishment of the initiating communication leg with the PTT server, the mobile station sending the initiating user's buffered speech signal along to the PTT server for transmission in turn to at least one other station.

2. The method of claim 1, wherein the first paging slot cycle index is slot cycle index 2, and wherein the second paging slot cycle index is slot cycle index 0.

3. A mobile station comprising:

a processor;

data storage;

a wireless communication interface comprising an antenna and being arranged to send and receive signals over a radio frequency air interface in communication with a base station;

a user interface comprising a microphone for receiving analog speech signals from a user, a speaker for playing out analog speech signals to the user, a display for presenting information to a user, and a mechanism engageable by a user in order to initiate push-to-talk (PTT) communication; and machine language instructions stored in the data storage and executable by the processor to carry out functions comprising:

receiving into the mobile station, from the user, a request to change a mode of operation of the mobile station from a normal mode to a PTT mode, responsive to the request, (i) switching from operation at a first paging slot cycle index to operation at a second paging slot cycle index, wherein the mobile station checks a paging channel for pages more often when operating at the second paging slot cycle index than when operating at the first paging slot cycle index, and (ii) sending a signaling message via an air interface to a base station controller, directing the base station controller to switch to operating at the second paging slot cycle index as well, receiving and buffering a speech signal provided by the user, setting up an initiating communication leg with a PTT server, and responsive to establishment of the initiating communication leg with the PTT server, sending the initiating user's buffered speech signal along to the PTT server for transmission in turn to at least one other station.

4. The mobile station of claim 3, wherein the first paging slot cycle index is slot cycle index 2, and wherein the second paging slot cycle index is slot cycle index 0.

* * * * *